United States Patent [19]

Murao

[11] Patent Number: 4,628,448
[45] Date of Patent: Dec. 9, 1986

[54] OPERATION MODE SETTING APPARATUS ON A SINGLE CHIP MICROPROCESSOR

[75] Inventor: Yutaka Murao, Tokyo, Japan

[73] Assignee: Tokyo Shibaura Denki Kabushiki Kaisha, Kawasaki, Japan

[21] Appl. No.: 675,270

[22] Filed: Nov. 29, 1984

Related U.S. Application Data

[63] Continuation of Ser. No. 367,661, Apr. 12, 1982, abandoned.

[30] Foreign Application Priority Data

Apr. 21, 1981 [JP] Japan .................................... 56-60127

[51] Int. Cl.$^4$ ............................................... G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,975,712 | 8/1976 | Hepworth et al. | 364/200 |
| 4,072,852 | 2/1978 | Hogan et al. | 364/900 |
| 4,080,659 | 3/1978 | Francini | 364/200 |

Primary Examiner—David Y. Eng
Attorney, Agent, or Firm—Finnegan, Henderson, Farabow, Garrett & Dunner

[57] ABSTRACT

On a single chip microprocessor which has $2^n$ operation modes, apparatus which permits selecting one mode out of the $2^n$ operation modes by using only one external pin connection and user program execution. A mode-setting register on the single chip microprocessor can be updated both through the external pin designating one of the two start modes, which are part of the $2^n$ operation modes, during the reset state of the microprocessor and through a write operation generated by executing a user program during the normal (nonreset) state of the microprocessor.

1 Claim, 4 Drawing Figures

F I G. 1
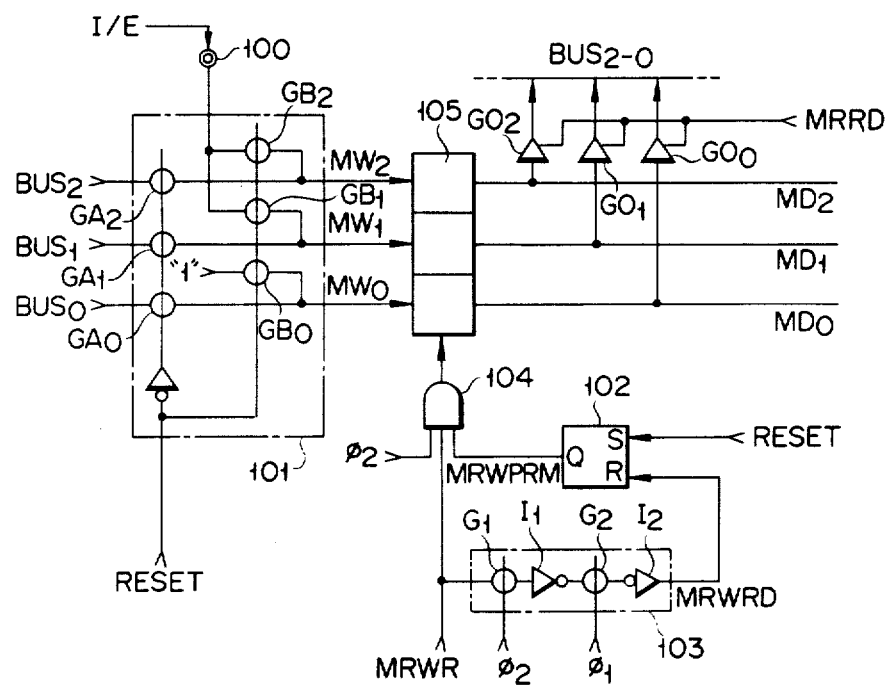
F I G. 2
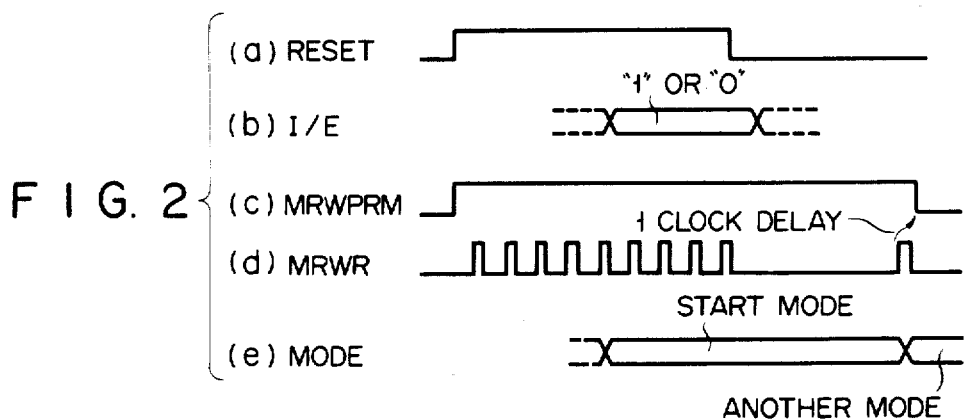

OPERATION MODE SETTING APPARATUS ON A SINGLE CHIP MICROPROCESSOR

This application is a continuation of application Ser. No. 367,661, filed Apr. 12, 1982 now abandoned.

BACKGROUND OF THE INVENTION

This invention particularly relates to an operation mode setting apparatus on a single chip microprocessor.

Due to the recent progress of semiconductor technique, the so-called single chip microprocessor has been developed which includes all of a microprocessor unit (MPU), RAM, ROM, and so forth in the same chip. This type of microprocessor comprises not only RAM, and ROM, but also external connection pins which are used as input-output (I/O) ports and also as bus connection terminals, and mode-setting circuits which can select any desired operation mode in order to effect, for example, the function of applying external RAM and ROM to increase total memory capacity. In this case, about eight operation modes are generally required to control the operation of the chip, for example one function being the test of the chip.

These eight operation modes are normally classified into two groups according to whether an internal or external memory is accessed. An internal or external (I/E) pin applied in an example of this invention is based on this classification. Hitherto, three external connection pins have been used to select any desired one of the above-mentioned eight operation modes. When a microprocessor is accessing externally, set mode data is supplied to the chip through the above-mentioned three external connection pins. If the three pins are used exclusively to set an operation mode, a noticeable waste of external pins occurs, thereby considerably reducing the function of the chip. At present, other function pins are used concurrently with the external connection pins.

However, when the conventional single chip microprocessor, constructed as described above, is mounted on an operation board, it is necessary to provide many complicated external circuits around the aforementioned external connection pins. As a result, the conventional single chip microprocessor has deficiencies in that a large number of circuit elements have to be provided for the mounting of the chip, and further problems are raised in respect of, for example, the chip-fitting cost and the noise susceptibility.

In the prior art, n-number (n≧1) of external connection pins are used to select one of $2^n$ operation modes, resulting in the waste of pins.

SUMMARY OF THE INVENTION

It is accordingly the object of this invention to provide an operation mode setting apparatus on a single chip microprocessor which enables any of the operation modes to be easily selected through a single external connection pin simply by adding a small number of circuits to the chip itself. To achieve this object, a mode-setting register is implemented on a single chip microprocessor in such a way that it can be updated both through the one external connection pin during the reset state of the microprocessor and through the write operation generated by a user program execution during the normal state of said microprocessor.

To attain the above-mentioned object, according to the present invention, there is provided an operation mode setting apparatus on a single chip microprocessor which comprises:

a mode-setting register which is formed of an n number of bits and allows for writing according to a program;

a gate circuit which supplies a signal to a specified external connection terminal in the reset state of the microprocessor, to designate an internal or external mode which produces start-mode setting data based on the mode-designating signal, and through which the mode-setting data is latched into the mode-setting register; and a circuit which causes mode-setting data, generated in accordance with the user program, to be latched only once into the mode-setting register, after the release of the reset state of the microprocessor.

BRIEF DESCRIPTION OF THE DRAWINGS

FIG. 1 is a block circuit diagram of an operation mode setting apparatus embodying this invention;

FIGS. 2(a) to 2(e) jointly denote a timing chart showing the operation of the operation mode setting apparatus according to the preferred embodiment of the present invention;

DETAILED DESCRIPTION OF THE PREFERRED EMBODIMENT

A description is of the eight operation modes is first given in order to more clearly describe the contents of this invention.

Figure 3:
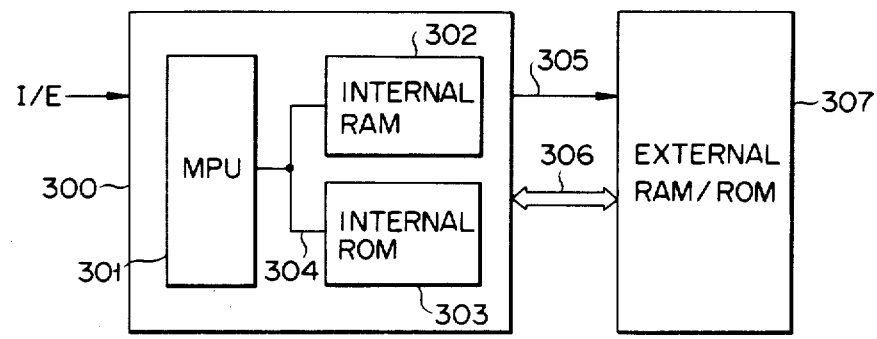
FIG. 3 is a block diagram of the system configuration of the present invention.
Figure 4:
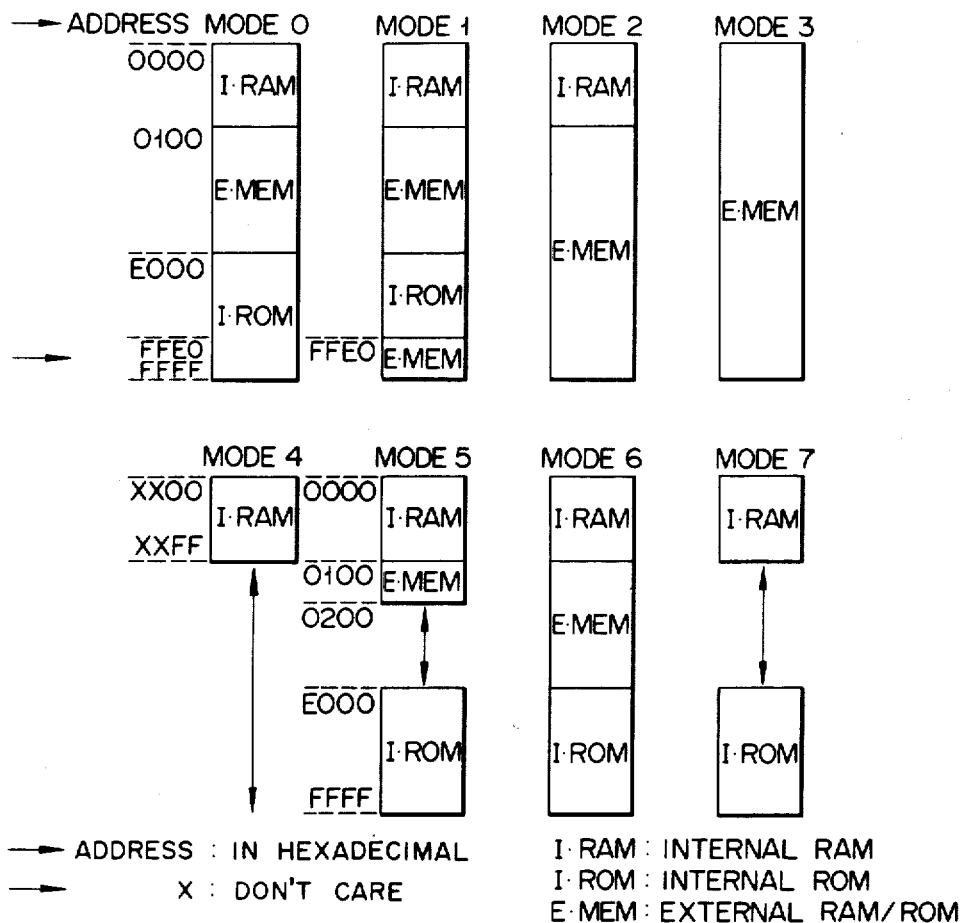
FIG. 4 illustrates the eight operation modes of the present invention.

FIG. 1 is a block circuit diagram of the present invention. FIG. 3 is a block diagram of the system configuration of the single chip microprocessor of the present invention shown connected to an external RAM/ROM. The single chip microprocessor 300 comprises a processor section 301, internal RAM 302 and internal ROM 303. An external RAM/ROM 307 is connected to the single chip microprocessor 300 by means of a control bus 305 and 16 bit address/data bus line 306. The address area of the subject microprocessor ranges from 0000 to FFFF in hexadecimal. FIG. 4 indicates eight possible operation modes anticipated from the system configuration of FIG. 3.

The microprocessor 300 is originally designed on the assumption that it is mainly used in a single chip mode where the external RAM/ROM 307 is disconnected. This case is represented by mode 7, in which internal RAM 302 and internal ROM 303 can be and should be used by themselves. Therefore, external address is meaningless and the address bus 306 is unnecessary from the system point of view. The address bus terminal of the microprocessor 300 is not used as an address bus but as a digital input-output port.

Mode 4 is modified from mode 7 by disabling the internal ROM 303. The internal ROM 303 is a mask ROM storing a particular data of a predetermined user program. If the microprocessor 300 alone is to be tested as a single chip, said internal ROM 303 is not necessary and should be disabled. This is why mode 4 is provided.

All the other modes are provided in anticipation of the necessity of supplementing insufficient memory capacity by connecting said external RAM/ROM 307. Typical among these other modes is mode 6 which uses all of the internal and external RAM and ROM units. In mode 2, the internal ROM is disabled. In mode 3, the internal RAM is further disabled, and the external RAM and ROM alone are made applicable. Mode 2 is the type which is most often used when a user is developing and debugging his program which is to be written into the internal ROM. In other words, mode 2 is useful when the internal ROM is replaced by an externally provided PROM. Mode 6 is useful when the internal ROM of the finished microprocessor is found to be insufficient in capacity.

Mode 1 is so arranged that where a vector address area FFE0 to FFFF (hexadecimal) for specifying a jump address to be used at the time of reset and interruption is provided particularly in the external memory, then the contents of the jump address can be freely changed by external means.

In mode 5, only areas of address 0100 to 0200 (hexadecimal) are accessed as the external memory, thereby decreasing the number of address signals used to designate an external address. In this case, the remaining bits are utilized not as an address but as a digital I/O port. In other words, mode 5 is useful to increase the capacity of the external memory on a small scale.

Mode 0 has substantially the same function as mode 6. However, mode 0 is the type which causes signals for instructing the internal read/write to all be indicated on the bus control 305 and address bus 306.

As described above, the eight operation modes are all generally required for a single chip microprocessor.

Referring to FIG. 1, reference numeral 100 denotes an external connection pin used to specify an internal or external mode (hereinafter referred to as an I/E pin). Reference numerals 101 to 104 are function circuits characteristic of this invention. Circuit 101 is a mode-selecting circuit comprising gates $GA_2$ to $GA_0$ which are opened only at the normal non-reset state (RESET = "0") of the microprocessor and gates $GB_2$ to $GB_0$ which are opened only at the reset state (RESET = "1") of the microprocessor and supplies mode-setting data carried by a signal passing through the I/E pin 100 to mode-write lines $MW_2$ to $MW_0$. The mode-selecting circuit 101 supplies the mode-setting data to the mode-write lines $MW_2$ to $MW_0$ in accordance with the contents of a start-mode setting signal transmitted through the I/E pin 100.

I/E pin is provided so as to specify the initial operation mode right after RESET goes from 1 to 0 and the microprocessor starts normal operation. The initial operation mode is called start mode.

Signal name I/E is an abbreviation of Internal/$\overline{\text{Exter}}$nal where "Internal" means that no external RAM/ROM should be connected to the microprocessor, i.e., only the internal memories are to be used and "External" means that external RAM/ROM can be connected.

Since modes 4 and 7 do not assume any external RAM/ROM, they are categorized as internal modes, and the others are grouped as external modes. In this embodiment of the invention, mode 7 is adopted as a start mode in case of I/E = 1 (internal) and mode 1 in case of I/E = 0 (external). In other words, internal start mode is mode 7 and external start mode is mode 1. If, at the reset time (RESET = "1") of the microprocessor, a signal denoting I/E = "0" to specify the external mode is delivered from the I/E pin 100, then external start mode data of "0, 0, 1" (mode 1) is supplied to the mode-write lines $MW_2$ to $MW_0$. If the I/E pin 100 supplies a signal of I/E = "1" for specifying the internal mode, then internal start mode data of "1, 1, 1" (mode 7) is supplied to the mode-write lines $MW_2$ to $MW_0$.

Reference numeral 102 represents an S-R type flip-flop circuit whose S input overrides R input and, after RESET goes 0, allows the mode-setting register 105 to be changed only once from the start mode to any other mode (any one of the modes 0, 2 to 6) by software (user program). Reference numeral 103 represents a delay circuit formed of the transmission gates $G_1$ and $G_2$ and the inverters $I_1$ and $I_2$ to delay a signal which is selectively generated, in synchronization with an internal clock signal $\phi_1$, to instruct the writing of a mode-setting data (said signal is hereinafter referred to as "MRWR"). When supplied with a signal denoting the reset state (RESET = "1"), the aforementioned flip-flop circuit 102 is brought to the set state. If, after the release of the reset state (RESET = "0"), the aforesaid MRWR signal is generated, then the flip-flop circuit 102 is reset by an MRWRD signal which is sent forth from the delay circuit 103 after being delayed by the time width of one clock pulse. A set output signal generated in this case acts as a signal allowing for the writing of mode-setting data (hereinafter referred to as an "MRWPRM").

Reference numeral 104 is a write control gate which produces a latch timing signal for the mode-setting register 105 from the above-mentioned MRWR signal, MRWPRM signal and clock pulse $\phi_2$. The mode-setting register 105 latches the mode-setting data supplied from the mode-write lines $MW_2$ to $MW_0$ by a latch timing signal transmitted through the write control gate 104. Mode-setting data $MD_2$ to $MD_0$ stored in the mode-setting register 105 are transmitted to a control circuit (not shown). The mode-setting data $MD_2$ to $MD_0$ can be read by the microprocessor unit (MPU) through the gates $GO_2$ to $GO_0$ and internal buses $BUS_2$ to $BUS_0$.

FIGS. 2(a) to 2(e) collectively denote a timing chart showing the signals issued from the various sections of FIG. 1 and the timing at which the modes are changed.

Description is now given with reference to FIGS. 2(a) to 2(e) of the operation of the operation mode setting apparatus on a single chip microprocessor of FIG. 1 embodying this invention. If a reset signal (RESET) is rendered active (RESET = "1") as shown in FIG. 2(a), then the flip-flop circuit 102 is brought to a set state. As a result, MRWPRM signal having a significant level ("1") shown in FIG. 2(c) is supplied at the output terminal Q of the flip-flop circuit 102. Also the gates $GB_2$ to $GB_0$ of the mode-selecting circuit 101 are opened.

If, during the abovementioned reset state, the I/E pin 100 is externally supplied with an I/E signal of I/E = "1" denoting an internal mode as shown in FIG. 2(b), then mode-setting data (internal start mode) of "1, 1, 1" denoting the mode 7 is supplied from the mode-selecting circuit 101 to the mode-write lines $MW_2$ to $MW_0$. The mode-setting data of "1, 1, 1" delivered to the mode-write lines $MW_2$ to $MW_0$ is latched into the mode-setting register 105 by a latch-timing signal which is sent forth from the write control gate 104 upon receipt of an MRWPRM signal of FIG. 2(c), an MRWR signal of FIG. 2(d) which is automatically generated in the microprocessor when RESET = 1, and a clock pulse $\phi_2$. Thereafter, the latched mode-setting data of "1, 1, 1" denoting the mode 7 is delivered to a control circuit (not shown). As seen from FIG. 4, the mode 7 is the type which is adapted for use as a single chip microprocessor and allows for the application of the internal RAM and ROM by themselves.

If, during the above-mentioned reset state, the I/E pin 100 is supplied with an I/E signal of I/E="0" which represents the external mode, mode-setting data (external start mode) is supplied from the mode-selecting circuit 101 to the mode-write lines $MW_2$ to $MW_0$. The mode-setting data is latched into the mode-setting register 105 by a latch timing signal transmitted through the write control gate 104. The latched mode-setting data of "0, 0, 1" denoting the mode 1 is sent to a control circuit (not shown).

As shown in FIG. 4, the mode 1 allows for the connection of the external RAM and ROM. A reset vector address can be externally fetched in the mode 1. Namely, if the external mode is specified by the I/E pin, a start is made from such a mode as is arranged in anticipation of the connection of external memories.

While the program of the start mode is processed after the reset release, a change from the start mode (mode 7 or 1) to any other mode is permitted only once. Namely, when an MRWR signal is supplied in response to a mode change instruction based on a command, generated during the execution of the user program, to write data into the mode-setting register 105, then a latch timing signal is delivered through the write control gate 104 in response to the MRWR signal and MRWPRM signal and clock pulse $\phi_2$. In this case, the reset signal (RESET) denotes, as seen from FIG. 2(a), that the reset has already been released (RESET="0"). In the mode-selecting circuit 101, therefore, the gates $GB_2$ to $GB_0$ are closed. Instead, the gates $GA_2$ to $GA_0$ are opened. Therefore, mode-setting data specified by the user program and supplied to the internal buses $BUS_2$ to $BUS_0$ is delivered to the mode-write lines $MW_2$ to $MW_0$. The mode-setting data is latched in the mode-setting register 105 by the latch timing signal.

Further, the MRWR signal supplied in accordance with the user program is delayed by the delay circuit 103 for a length of time corresponding to a period of a one clock period, and then delivered to the reset input terminal R of the flip-flop circuit 102 to reset it. Thereafter, the flip-flop circuit 102 is not set, until the CPU resetting signal (RESET signal) of FIG. 2(a) is again rendered active (RESET="1"). Therefore, the change of the start mode to any other mode specified by the user program is permitted only once after the reset release. As a result, the mode cannot be changed again, until the reset signal is rendered active to reset the CPU once more. This procedure is used to prevent the erroneous rewriting of data which might occur due to the destructive run of the program caused by noise. The above-mentioned arrangement enables any of the aforementioned eight modes ranging from mode 0 ("0, 0, 0") to mode 7 ("1, 1, 1") to be freely selected.

As mentioned above, during the reset state (RESET="1") of the microprocessor, data on the start mode corresponding to the I/E signal supplied to the I/E pin is automatically produced by hardware. The mode-setting data represents the internal mode of "1, 1, 1" (mode 7) in case of I/E="1", and the external mode of "0, 0, 1" (mode 1) in case of I/E="0". After the reset release (RESET="0"), the selected mode-setting data is written in the mode-setting register only once in accordance with the user program, thereby enabling the start mode to be changed to any other mode. The above-mentioned mode setting means freely selects any of the eight modes (mode 1 to mode 7) by means of a single I/E pin 100, offering the advantage of an increased number of externally added circuits, and extremely simplifying the arrangement of the peripheral circuit system of the single chip microprocessor.

With the aforementioned embodiment, the mode is changed only once by software (user program), thereby requiring the flip-flop circuit 102 and delay circuit 103 to be fitted to the chip. Depending on the intended application, however, these elements need not be provided. Further, it is unnecessary to apply the gates $GO_2$ to $GO_0$ in order to transmit the contents of the mode-setting register to the microprocessor unit through the internal buses $BUS_2$ to $BUS_0$. The foregoing embodiment handles eight modes, causing the mode-setting register 105 and mode-selecting circuit 101 to be respectively formed of 3 bits. However, this arrangement need not be exclusively followed. Namely, the bit number can obviously be increased or decreased depending on the number of modes to be used.

The above-described operation mode setting apparatus embodying this invention can easily select any of a plurality of modes simply by fitting a number of circuits to the chip and using a single external connection pin, thereby making it possible to simplify the arrangement of the peripheral circuit system of the microprocessor, elevate its reliability regarding noise susceptibility and reducing its manufacturing cost.

What is claimed is:

1. An operation mode setting apparatus on a single chip microprocessor having an internal bus which comprises:

an n-bit operation mode-setting register means for storing the data which specifies one of $2^n$ operation modes, which modes include two start operation modes;

a single external pin connection for receiving externally supplied logic level signals for specifying one of the two start operations modes;

a first circuit means for generating, according to the logic level signal on said external connection pin, the data for designating the start operation mode;

a second circuit means for causing mode-setting data generated through a user program execution to select one of the $2^n$ operation modes;

a selector means for allowing said data for designating the start operation mode to be latched into the operation mode-setting register means at the reset state of the microprocessor and for selectively allowing said mode-setting data on the internal bus of the microprocessor to be latched into the operation mode-setting means after the reset state of the microprocessor; and means for preventing data from being written in the mode-setting register means, until the microprocessor is again brought to a reset state after data is written in the mode-setting register means through said user program execution after the release of the reset state of the microprocessor.

* * * * *